Patented Jan. 21, 1947

2,414,552

UNITED STATES PATENT OFFICE 2,414,552

PREPARATION OF PYRAZINE

Harry Fred Pfann, Greenwich, and James Kenneth Dixon, Riverside, Conn., assignors to American Cyanamid Company, New York, N. Y., a corporation of Maine No Drawing. Application October 31, 1942, Serial No. 464,108

7 Claims. (Cl. 260—250)

This invention relates to the preparation of cyclic nitrogen bases such as pyrazine. More particularly, the invention relates to the conversion of ethylene polyamines and hydroxyethyl ethylene polyamines to pyrazine in the vapor phase by catalysis.

Pyrazine as a raw material for the manufacture of aminopyrazines and ultimately sulfanilamido pyrazines, has become of increasing commercial importance, particularly in the field of chemotherapy. Although pyrazine itself is a comparatively well known compound, in the past processes for its production on a scale suitable for development on a commercial basis have been lacking. When produced, it has always been on a comparatively small scale, using inefficient processes giving yields of about 3-6%.

In our copending application, Serial No. 460,684, filed October 3, 1942, we have shown that alkylene polyamines such as diethylene triamine and the like can be converted to piperazine in the vapor phase using suitable catalysts. In the copending application of one of us, Serial No. 460,683, filed October 3, 1942, it has also been disclosed that a similar reaction can be carried out for the conversion of hydroxyalkylene polyamines such as hydroxy ethyl ethylene diamine to piperazine. Piperazine, when once prepared can be converted to pyrazine by dehydrogenation. An improved process for carrying out this reaction is disclosed in the copending application of one of us, Serial No. 443,703, filed May 20, 1942.

Carrying out the reaction in these stages, namely the preparation of piperazine and the conversion of the resultant product to pyrazine, while permitting the manufacture of pyrazine of high quality and in good yields, suffers from a number of practical drawbacks. First of all, it requires the operation of two independent processes. This not only involves a duplication of apparatus and increases handling losses but provides an opportunity for two sets of side reaction products to be formed. Losses during distillation are relatively high. If the process is carried out in two stages, two distillations are required which cause a loss which would be reduced if a single distillation could be made to suffice. Piperazine itself is easily cracked. The necessity for two passes over the catalyst results in a considerable direct loss of product which could be reduced if a single pass could be made to serve the purpose. As a result there is a definite need for a good single stage process.

However, because of the completely different nature of the reactions involved in each stage, it was concluded that the two stages could not be combined. For example, in the conversion of hydroxyethyl ethylene diamine to piperazine, the reaction involved a combined cyclization and dehydration whereas the conversion of piperazine to pyrazine involves dehydrogenation. Similarly, the conversion of a compound such as diethylene triamine to piperazine involves a cyclization and deamination, while the step from piperazine to pyrazine requires dehydrogenation. Nevertheless, as pointed out above, because of the practical advantages, a single stage process of converting an alkylene polyamine to pyrazine is desirable. Surprisingly enough, we have now found that in the vapor phase the two steps may be combined and carried out in a single stage by using suitable catalysts at elevated temperatures.

In general the process of the present invention comprises the vaporization of an alkylene polyamine or a hydroxyalkylene polyamine and the passing of the vaporized material over a suitable catalyst at elevated temperatures. By carrying out the reaction in this way, a conversion of an alkylene polyamine or hydroxyalkylene polyamine to pyrazine in a single stage process may be carried out. The product produced is of high quality and the reaction may be carried out in good yield. As high as 20-25% of pyrazine, based on the amount of material fed may be obtained in a single pass with an overall efficiency of 60-70%. Any unconverted amines and/or piperazine in the reaction products may be recovered and recycled.

The practice of the present invention is not necessarily limited to the use of any particular apparatus. It is only necessary that there be a suitable means for vaporizing the material and passing the vaporized material over a heated catalyst at a rate dependent upon the volume of the catalyst and upon the temperature at which it is maintained. The reacted vapors must be collected, as by condensation, and the product isolated, as by fractional distillation. So long as these functions may be accomplished each of the elements of this apparatus may be varied almost at will. The development work was carried out using stainless steel reaction vessels. However, any material which is catalytically inactive, does not contaminate the materials and is resistant to intergranular attack by the hydrogen liberated during the reaction may be used.

The nature of the catalyst used, however, is important. The desirable results obtained in the present invention appear to be due to the use of a suitably compounded catalyst having in effect two active elements. Previous experience in developing the processes of our aforementioned copending applications has shown that a surface active oxide such as alumina, titania, thoria and the like or mixtures of such oxides were effective in promoting the combined cyclization and dehydration and/or deamination reactions. For purposes of discussion in the present specification this group will be referred to as cyclo dehydration and/or cyclo deamination catalysts.

Similarly, it was found that a metal such as copper, nickel, iron, cobalt, palladium or platinum or a metallic oxide such as the oxides of chromium, molybdenum or vanadium or a compounded material such as copper chromite is required in order to accomplish the dehydrogenation step without producing excessive side reaction products or unnecessary cracking. Again, for the purposes of the present specification, this group will be referred to as dehydrogenation catalysts.

According to our present invention, we have now found that the materials referred to above as dehydrogenation catalysts also possess to varied extent the property of acting as cyclo dehydrating or cyclo deaminating catalysts. By taking advantage of this fact, the two separate stages by which the reaction was previously carried out may now be performed concomitantly in the same converter. Particularly good results are obtained by using a compounded dehydrogenation catalyst comprising the correct amount of one of the materials designated above as a dehydrogenation catalyst supported on a material selected from the group designated as a cyclizing catalyst.

The respective quantities of materials which comprise the dehydrogenation catalyst may be varied within quite wide limits. We have found that those catalyst masses in which the metal or metallic oxide constituent is present in amounts of about 2–15% operate satisfactorily. The preferable range, however, appears to be about 4–8%. The metallic or metallic oxide constituent may be deposited on the surface active support in any one of several known ways since the method of preparing the catalyst forms no part of the present invention. For example, a soluble, reducible metal salt may be deposited on the carrier, dried, decomposed and reduced to the desired metal or its oxide.

The nature of cyclodehydration catalyst used as a support may also be varied without departing from the scope of the present invention. We have found, for example, that various forms of surface-active alumina such as alumina gel and bauxite; certain of the aluminum silicates, such as kaolin and the like; as well as oxides of thorium, titanium, zirconium may be used. Since excellent results may be obtained using an alumina support comprising commercial "Activated Alumina," prepared according to any of a number of processes such as those illustrated, for example, in U. S. Patents 1,868,869 and 2,015,593 and because such material is readily available it is perhaps preferable. However, the invention is not necessarily so limited.

The temperatures at which the reaction is carried out may also be varied within certain limits. The optimum temperature will be dependent upon the nature and amount of the catalyst used as well as the contact time, since these elements must be balanced in order to determine the final result. Results can be obtained using operating temperatures as low as 300° C. in some circumstances whereas temperatures as high as about 550° C. or even higher may be needed in others. Under most circumstances, the operating temperature, however, will fall within the limits of from about 350–450° C. For example, in using a nickel-on-Activated Alumina catalyst an operating temperature of from 350–400° C. appears to be the optimum. On the other hand, a catalyst such as chromium oxide-on-alumina will require a higher temperature to give equivalent results. A somewhat higher temperature is desirable for deamination and/or dehydration than is necessary during dehydrogenation. Since there is less tendency for the materials to crack at the lower temperatures it is advisable, although not absolutely essential, to decrease the temperature of the catalyst slightly near the exit end of the mass.

Nor is the process of the present invention necessarily limited to the production of pyrazine or to the use of any particular starting materials. In the foregoing discussion, pyrazine has been used for purposes of illustration because its production is typical of the process of the present invention and products which can be produced. Pyrazine will be so used throughout the remainder of the specification. Pyrazine itself may be prepared according to the process of the present invention from a number of different materials. Diethylene triamine has been mentioned as a suitable starting material. The feed may comprise the amine per se or one of its volatile salts may be used. Similarly, substituted pyrazines such as a methyl pyrazine can be prepared from such C-substituted homologs of diethylene triamine as 2-aminopropyl ethylene diamine or bis-2-amino propyl amine. Of the two amine groups which enter into the cyclization, at least one should have two replaceable hydrogens.

Pyrazine or substituted pyrazines can also be prepared from hydroxyethyl ethylene diamine or C-substituted homologs such as 2-hydroxy-propyl ethylene diamine, 2-amino propyl ethanol amine, 2-hydroxybutyl ethylene diamine and the like. It is only necessary that the most remote amino group from the hydroxy group be separated therefrom by at least two carbon atoms and be a primary amine having two replaceable hydrogens. The presence of extensive side chain substituents, however, tends to reduce the yield. Any tendency either for the molecule to crack or for the reaction products to polymerize is increased by their presence. The occurrence of polymerization in appreciable quantity is particularly undesirable since it directly reduces the active period of the catalyst. It is an advantage of the present invention that by using the catalyst and temperature ranges indicated the tendency toward polymerization products is minimized.

Where it is desirable to do so, the catalyst may be readily reactivated. This can be done, for example, by heating the catalyst in a confined space while passing air through the mass to burn off the impurities. The actual temperature at which the material is heated will vary with the rate of air flow through the mass. Care should be taken to maintain an air flow such that the temperature of the mass will be maintained below the point at which sintering will occur since this effectively destroys usefulness of the catalyst.

The invention will be described in greater detail in conjunction with the following specific examples which are meant to be merely illustrative and do not in any way limit the invention.

*Example 1*

A series of reactions was carried out in which diethylene triamine was vaporized at the rate of about 3 ml./min., the vaporized material was diluted with hydrogen at the rate of 80 ml./min.

and passed over a catalyst of 8-14 mesh Activated Alumina on which was deposited about 4.5% of metallic nickel. The catalyst was maintained at approximately 400° C. throughout each of the runs and was reactivated between each 2 hr. operating cycle. The vaporized reacted material was collected by condensation and separated into its component parts by fractional distillation. The pyrazine-containing fraction boiling from about 110–120° C. was collected and the pyrazine isolated therefrom. The unreacted amine and the piperazine fractions were recycled. Analysis of the results shows a good yield of pyrazine with an overall efficiency of about 49% for each pass.

*Example 2*

The procedure of Example 1 was repeated under similar conditions except that the catalyst comprised an initial portion of 240 ml. of 8-14 mesh Activated Alumina and the final portion comprised 125 ml. of Activated Alumina upon which 4.5% nickel had been deposited. Analysis of the results indicated that an average yield of about 23% pyrazine was obtained in a single pass with an overall efficiency of about 50%.

*Example 3*

The procedure of Example 2 was repeated, feeding hydroxyethyl ethylene diamine to the reaction vessel at the rate of 3 ml./min. but using no diluent gas. Analysis of the results indicated that an average yield of about 22% of pyrazine was obtained for any single pass with an overall efficiency of about 50%.

While the discussion and examples have been largely limited to the use of a single catalyst body comprising a dehydrogenation catalyst on the surface-active oxide support which acts as a cyclizing catalyst, the invention is not necessarily so limited. For example, a temperature of from about 350–500° C. has been found necessary to carry out the desired reaction. Since the vaporized material leaves the vaporizing apparatus at a considerably lower temperature it is preferably pre-heated to approximately the desired reaction temperature before being brought into contact with the compounded catalyst. This pre-heating step may be carried out in the absence of any catalyst if so desired.

It is often convenient, however, to arrange the catalyst mass in two zones, the first of which contains a catalyst of the type referred to above as cyclodeaminating or cyclodehydrogenating catalysts and the second portion comprising a dehydrogenation catalyst. Such a procedure is illustrated above in Example 2. Raising the temperature of the vaporized material in the presence of a cyclodehydrating catalyst produces considerable cyclization before the vapors come into contact with the dehydrogenation catalyst. This favors a high yield and a good overall efficiency. It also has the advantage that the dehydrogenation catalyst does not have the opportunity of effecting the materials before a substantial degree of cyclization has occurred.

This advantage, however, must be counterbalanced against the advantage which is obtained by having the entire catalyst mass capable of carrying out both parts of the reaction. In such a case, because the catalyst is capable of performing both functions there is less opportunity for the cyclized material to be broken down before it is dehydrogenated. An equilibrium between the cyclized material and the other reaction products of the cyclization can not become established. This favors the production of cyclized compounds and the yield and overall efficiency of the process is thereby improved. Comparable results are therefore obtained whether the vapors are passed over a single zone or double zone catalyst. The latter, however, is more convenient to operate and usually produces somewhat better conversion.

We claim:

1. A method of producing pyrazines which comprises vaporizing a material selected from the group consisting of the dialkylene triamines having two terminal primary amino groups and in which all the amino groups are separated by at least two carbon atoms, 2-hydroxyethyl ethylene diamine, their C-alkyl substituted homologs, the volatilizable salts thereof and mixtures of the same, passing the vapors over a dehydrogenation catalyst maintained at temperatures of from about 300–500° C., collecting the reaction products and isolating the pyrazine therefrom.

2. A method according to claim 1 in which the catalyst comprises 2 to 12% of metallic nickel deposited on "Activated" Alumina and the temperature is maintained at from 350–400° C.

3. A method according to claim 1 in which the catalyst is divided into two portions the initially contacted portion comprising a material selected from the group consisting of the oxides of aluminum and titanium and mixtures of the same and the finally contacted portion comprising a dehydrogenation catalyst.

4. A method according to claim 1 in which the catalyst is divided into two portions the initially contacted portion comprising a material selected from the group consisting of the oxides of aluminum, titanium and mixtures of the same and the finally contacted portion comprising 2 to 12% by weight of material selected from the group consisting of metallic copper, iron, cobalt, nickel and the oxides of chromium, vanadium and molybdenum supported on "Activated" Alumina.

5. A method according to claim 1 in which the catalyst is divided into two portions the initially contacted portion comprising a material selected from the group consisting of the oxides of aluminum, titanium and mixtures of the same and the finally contacted portion comprising 2 to 12% of metallic nickel deposited on "Activated" Alumina the average temperature of the second portion being maintained at from 350–400° C.

6. A method according to claim 1 in which the catalyst is divided into two portions the initially contacted portion comprising a material selected from the group consisting of the oxides of aluminum, titanium and mixtures of the same and the finally contacted portion comprising 2 to 12% by weight of a material comprising substantially chromium oxide supported on "Activated" Alumina the average temperature of the second portion being maintained at from 375–425° C.

7. A method according to claim 1 in which the catalyst is divided into two portions the initially contacted portion comprising a material selected from the group consisting of the oxides of aluminum, titanium and mixtures of the same and the finally contacted portion comprising 2 to 12% of copper chromite supported on "Activated" Alumina the average temperature of the second portion being maintained at from 375–425° C.

HARRY FRED PFANN.
JAMES KENNETH DIXON.